(12) United States Patent
Venturelli et al.

(10) Patent No.: US 11,065,976 B2
(45) Date of Patent: Jul. 20, 2021

(54) DOCKING AND RECHARGING STATION FOR UNMANNED AERIAL VEHICLES CAPABLE OF GROUND MOVEMENT

(71) Applicant: ARCHON TECHNOLOGIES S.R.L., Incubatore Modena Hub R-Nord (IT)

(72) Inventors: Davide Venturelli, San Francisco, CA (US); Roberto Navoni, Bergamo (IT); Paolo Velcich, Hong Kong (HK)

(73) Assignee: Archon Technologies S.R.L., Modena (IT)

( * ) Notice: Subject to any disclaimer, the term of this patent is extended or adjusted under 35 U.S.C. 154(b) by 294 days.

(21) Appl. No.: 16/074,536

(22) PCT Filed: Feb. 23, 2017

(86) PCT No.: PCT/US2017/019032
§ 371 (c)(1),
(2) Date: Aug. 1, 2018

(87) PCT Pub. No.: WO2017/147237
PCT Pub. Date: Aug. 31, 2017

(65) Prior Publication Data
US 2019/0039752 A1 Feb. 7, 2019

Related U.S. Application Data

(60) Provisional application No. 62/299,380, filed on Feb. 24, 2016.

(51) Int. Cl.
*B64F 1/36* (2017.01)
*B60L 53/68* (2019.01)
(Continued)

(52) U.S. Cl.
CPC ............ *B60L 53/68* (2019.02); *B60L 53/30* (2019.02); *B60L 53/50* (2019.02); *B64C 25/405* (2013.01); *B64C 39/024* (2013.01); *B64F 1/362* (2013.01); *H02J 7/0027* (2013.01); *H02J 7/0044* (2013.01); *B60L 2200/10* (2013.01); *B60L 2230/22* (2013.01); *B64C 29/0025* (2013.01); *B64C 2201/18* (2013.01); *H02J 50/00* (2016.02);
(Continued)

(58) Field of Classification Search
CPC .. B60L 2200/10; B60L 2230/22; B60L 53/30; B60L 53/50; B60L 53/68; B64C 2201/18; B64C 25/405; B64C 29/0025; B64F 1/362; H02J 50/00
USPC .......................................................... 244/50
See application file for complete search history.

(56) References Cited

U.S. PATENT DOCUMENTS 4,944,321 A 7/1990 Moyet-Ortiz
7,053,578 B2 5/2006 Diehl et al.
(Continued)

*Primary Examiner* — Claude J Brown
(74) *Attorney, Agent, or Firm* — King & Wood Mallesons LLP

(57) ABSTRACT

The techniques introduced here include a system to perform an efficient docking and recharging of unmanned aerial vehicles capable of ground movement, which makes use of a platform, a ramp, a circuitry and an interface integrated in the platform that are capable of recharging said vehicles, and through which it is possible to shield from adverse weather conditions and to recharge multiple unmanned aerial vehicles capable of ground movement at the same time, without incurring in unwanted disturbances and delays.

10 Claims, 10 Drawing Sheets

(51) Int. Cl.
   *B60L 53/30* (2019.01)
   *H02J 7/00* (2006.01)
   *B60L 53/50* (2019.01)
   *B64C 25/40* (2006.01)
   *B64C 39/02* (2006.01)
   *H02J 50/00* (2016.01)
   *B64C 29/00* (2006.01)

(52) U.S. Cl.
   CPC ............ *Y02T 10/70* (2013.01); *Y02T 10/7072* (2013.01); *Y02T 90/12* (2013.01); *Y02T 90/14* (2013.01); *Y02T 90/16* (2013.01)

(56) References Cited

U.S. PATENT DOCUMENTS

| | | | |
|---|---|---|---|
| 8,002,604 B2 * | 8/2011 | Van de Rostyne | A63H 27/12 |
| | | | 446/37 |
| 8,511,606 B1 * | 8/2013 | Lutke | B64C 39/028 |
| | | | 244/58 |
| 9,862,285 B2 * | 1/2018 | Lee | B60L 53/30 |
| 2005/0231157 A1 | 10/2005 | Sanders, Jr. et al. | |
| 2006/0049304 A1 | 3/2006 | Sanders, Jr. et al. | |
| 2009/0314883 A1 | 12/2009 | Arlton et al. | |
| 2014/0180914 A1 * | 6/2014 | Abhyanker | G05D 1/102 |
| | | | 705/39 |
| 2015/0259078 A1 * | 9/2015 | Filipovic | H01K 1/62 |
| | | | 244/114 R |
| 2016/0157414 A1 * | 6/2016 | Ackerman | G05D 1/0274 |
| | | | 701/25 |
| 2016/0257426 A1 * | 9/2016 | Mozer | B64C 39/024 |
| 2016/0364989 A1 * | 12/2016 | Speasl | B64F 1/222 |
| 2017/0023949 A1 * | 1/2017 | Fisher | B64C 29/02 |
| 2017/0050749 A1 * | 2/2017 | Pilskalns | B64D 45/08 |
| 2017/0158353 A1 * | 6/2017 | Schmick | B60L 11/182 |
| 2017/0225801 A1 * | 8/2017 | Bennett | B64F 1/005 |
| 2017/0240062 A1 * | 8/2017 | Jaiswal | B60L 53/14 |
| 2018/0244404 A1 * | 8/2018 | Park | B64F 1/007 |
| 2019/0002127 A1 * | 1/2019 | Straus | B64F 1/007 |
| 2019/0031346 A1 * | 1/2019 | Yong | A01B 79/005 |

* cited by examiner

DOCKING AND RECHARGING STATION FOR UNMANNED AERIAL VEHICLES CAPABLE OF GROUND MOVEMENT

FIELD

Various embodiments of the present invention generally relate to a system for charging and docking one or multiple Unmanned Aerial Vehicles (UAVs or drones).

BACKGROUND

UAVs are unmanned (e.g., remotely piloted) aircrafts that can carry sensors, video cameras, communications equipment or other payloads, typically controlled by an operator, and whose flight can follow a pre-defined flight instruction.

Current technological developments in this field address the full automatization of UAVs, but they are often constrained by the UAVs' limited energy storage.

Another recurrent problem in UAVs' technology is that current solutions do not allow the required flexibility when drones have to be recharged. In particular, the existing charging and recharging stations that have been envisaged often allow only one UAV to be charged at the same time.

Even when previous solutions allowed more than one UAV to be charged contemporaneously, the act of landing on the recharging station and connecting to the charging device required accurate remote control or an extraordinary precision. For example, the drones had to land exactly in the spot where they could be immediately connected to the recharger. Such solutions therefore required more complex software to direct the UAV on the exact point of landing and/or human remote intervention. Some other solutions make use of mechanical aids to position the UAV on the spot after its landing in a larger area.

The above difficulties were made even more complex in case of adverse weather conditions, or loss of telecommunication/GSP signal, which, in the case of flying UAVs, can destabilize their landing trajectory and their ability to be connected instantly to the charging device.

Another fallacy of the previously designed solution was also connected to adverse weather conditions: UAVs could not find any shelter while recharging, being exposed to rain, tempests, strong winds etc. In case more than one drone had to be recharged, they not only had difficulties in getting recharged, but had to stay in line without any shelter waiting for their turn to receive new energy, with the risk of finishing their battery before receiving new energy.

The above-mentioned problems can be even more severe if we think that the current state of the art allows battery-powered UAVs to carry out short flights in a fully autonomous way between, e.g., two set points but most UAVs available on the market have a limited flight time between recharges (e.g., around 15 minutes), which may further limit wider use of this technology.

SUMMARY OF THE DESCRIPTION

Embodiments of the present disclosure include an UAV docking and recharging station (the "UAV Station") which is meant to overcome the problems of the current state of the art, some of which have been previously described, especially those related to the adverse weather conditions, to the low recharging capabilities of the UAVs and to the difficulty of managing their landing system.

In fact, embodiments of the present disclosure include a system which can guarantee the full operability, 24 hours per day and independently of weather or telecommunication conditions, of multiple UAVs, while providing at the same time a safe, waterproof docking point where UAVs can be sheltered when not in use, even under heavy rain, snow, strong wind etc. Said embodiments are capable of ensuring safe landing in adverse weather conditions and continuous operability of the UAV fleet, thanks to a perfectly functional and sheltered location to recover the UAVs during the no-flying phase of a given mission.

Embodiments of the present disclosure can include a platform whose shape can be, e.g., circular or polygonal, and whose diameter can vary, e.g., from about 30 cm to several meters. The platform can be raised above the ground and protected by a waterproof system. The platform can act both as a landing and take-off launch pad and as a communication relay, thus interacting with some or all the flying UAVs within the area, as well as with other mobile robots.

Embodiments of the present invention may employ wireless charging technologies, which can offer improved reliability over time, especially if compared to other solutions (e.g., mechanical battery swap or other conductive systems) which may be more vulnerable to the deterioration of the connection pads due to galvanic corrosions or other chemical effects. Embodiments of the present invention include UAVs equipped with an on-board unit to ensure coupling to the recharging system.

In order to overcome the issue of imprecise landing, embodiments of the present disclosure include a UAV Station that is consisting of a sheltered area protected by a top shield, or a combination between a small hangar and a garage, which can also be equipped with a ramp to facilitate the UAV's movement, especially in embodiments of the present disclosure in which the UAVs are equipped with wheels or similar ground propulsion system, either integrated or attached to the vehicle in the form of a plugin element. Such a UAV configuration combined with the above-described features of the station can allow, in some embodiments of the disclosure, the UAV to reach the recharging station autonomously by ground movement, using for example a tracking system and docking procedure based on known robotics techniques.

In some embodiments of the present disclosure, the docking and recharging station can also be equipped with sensors and other guiding devices (e.g., electromechanical guides, laser or radar systems) to assist the UAV in the docking phase and in the coupling to the recharging electronics. This can include, e.g., an image recognition system with alignment by means of multiple LEDs on the station, or known systems and methods that generate a 3D or 2D point cloud of nearby objects real-time (Simultaneous Localization And Mapping—SLAM—systems).

In some embodiments of the disclosure, the final docking of UAVs to the docking and recharging station can be stabilized by use of, e.g., mechanical guides. In some embodiments, the station and the UAVs can be protected by a movable rain or snow shield (actuated by, e.g., electromagnetic motors) once the UAV is docked to the station.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
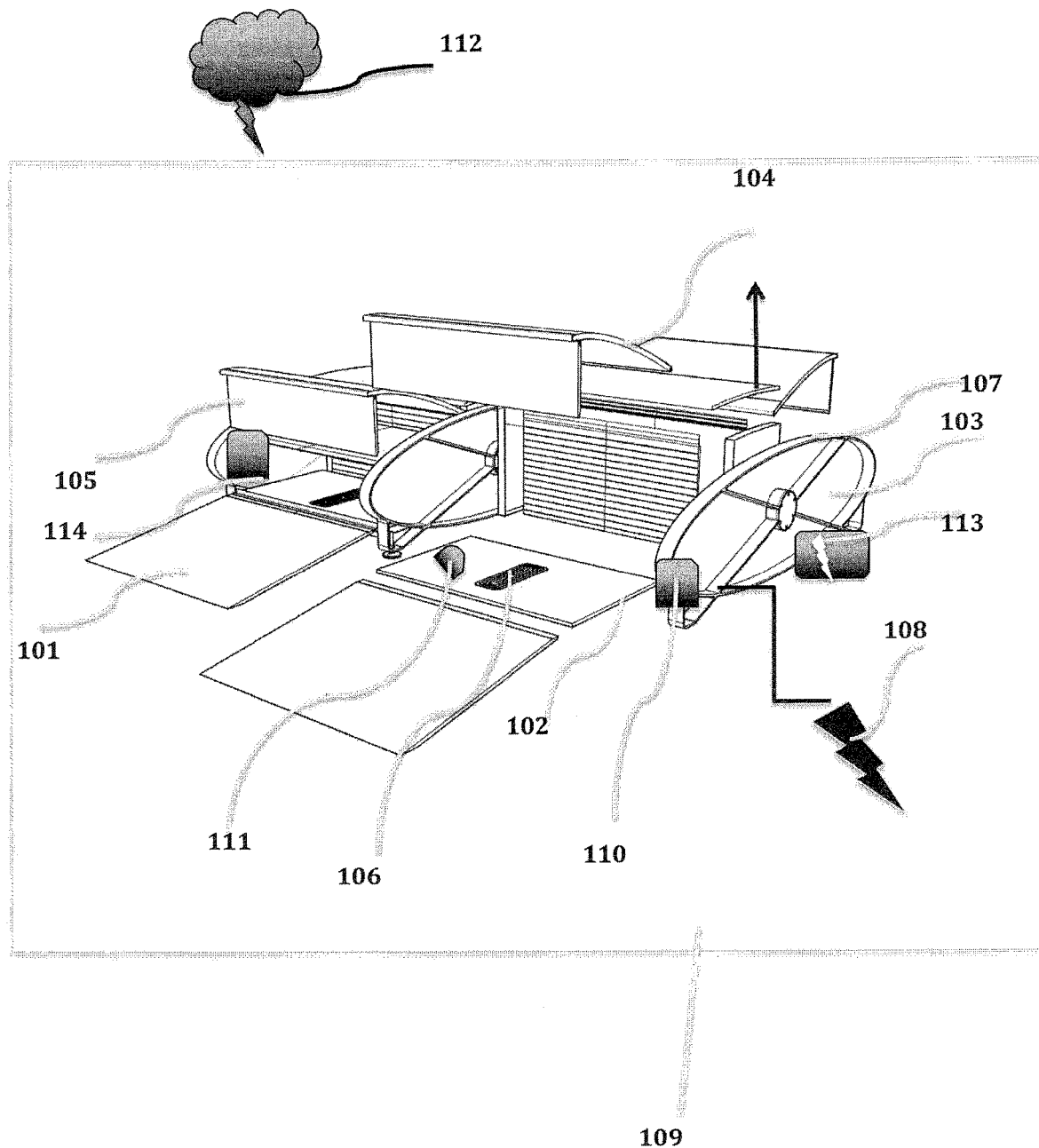
FIG. 1, in accordance with an embodiment of the disclosure, provides an illustrative representation of a station for charging and docking one or multiple Unmanned Aerial Vehicles (UAVs)
Figure 2:
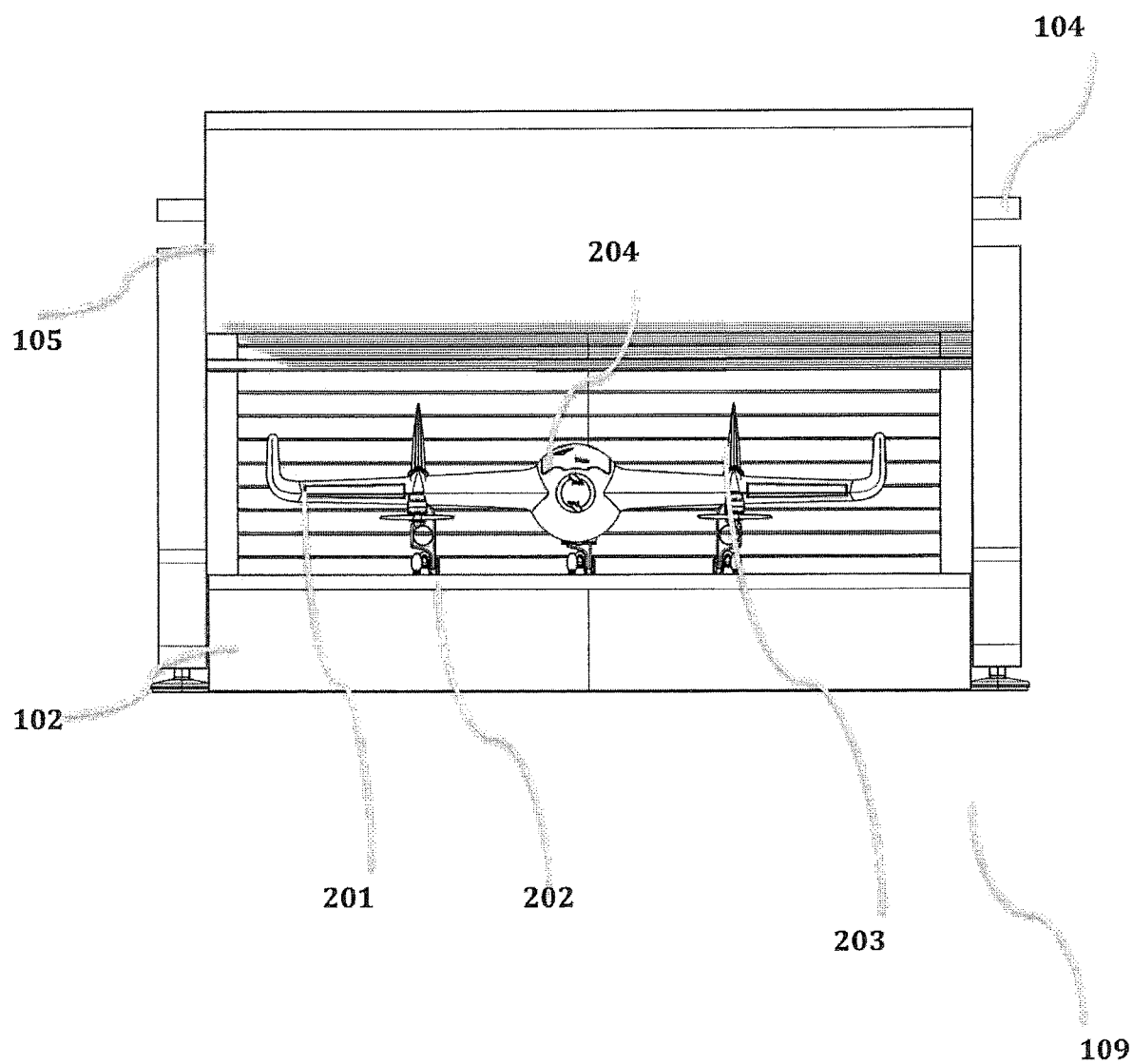
FIG. 2, in accordance with an embodiment of the disclosure, is another representation of a station for charging and docking one or multiple Unmanned Aerial Vehicles from a different perspective, also showing an UAV inside it.
Figure 3:
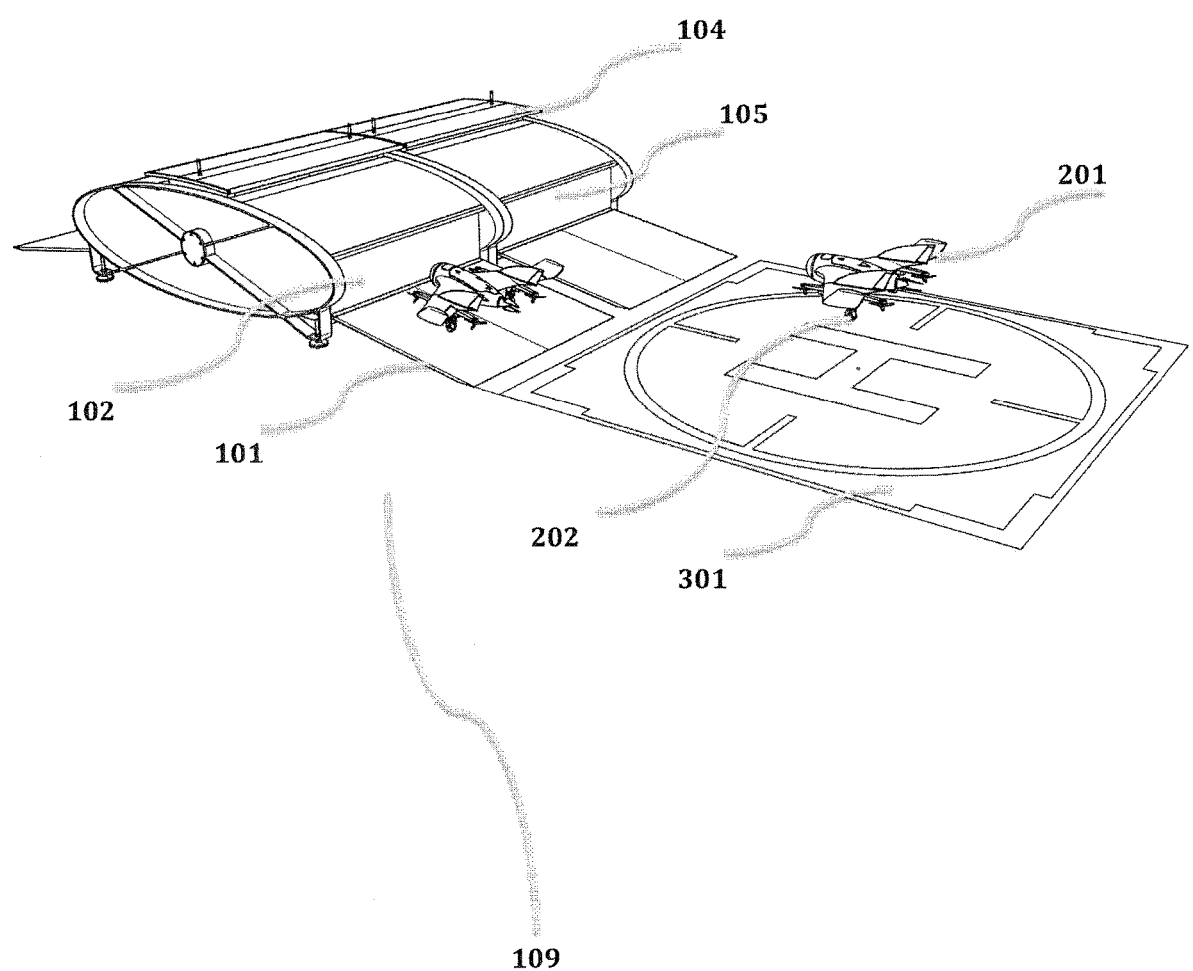
FIG. 3, in accordance with an embodiment of an invention, is another representation of a station for charging and docking UAVs, showing a possible point of landing far from the station with an UAV approaching the station through its ground propulsion system.
Figure 4:
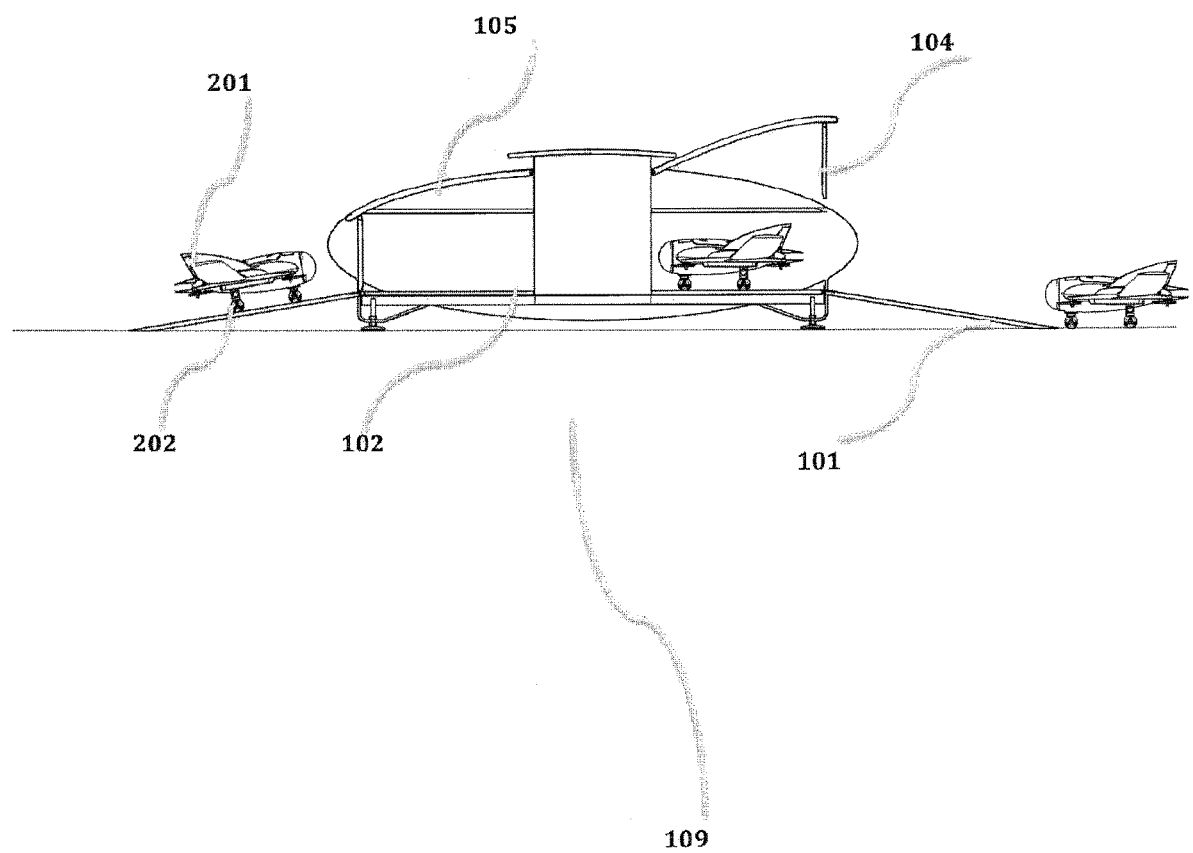
FIG. 4, in accordance with an embodiment of the disclosure, shows once again a station for charging and docking UAVs from a side view.
Figure 5:
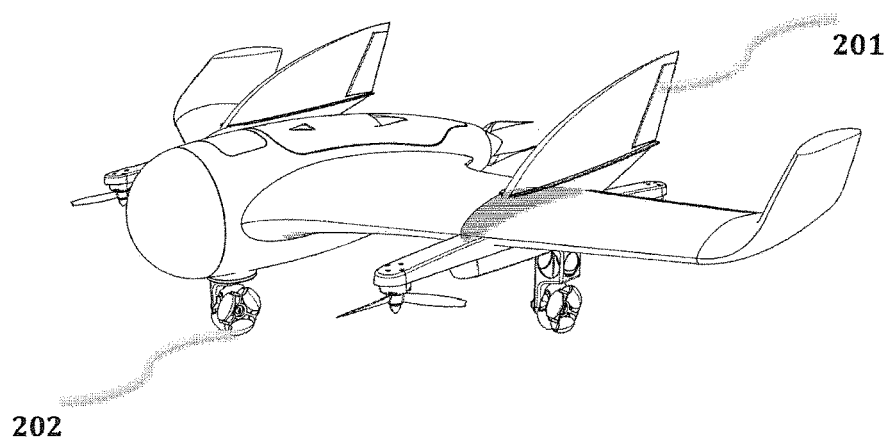
FIG. 5, in accordance with an embodiment of the disclosure, illustrates UAVs equipped with a ground-propulsion system from different perspectives.
Figure 5:
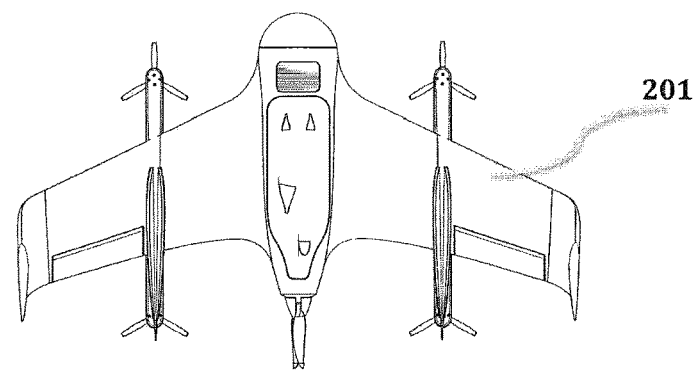
Figure 5:
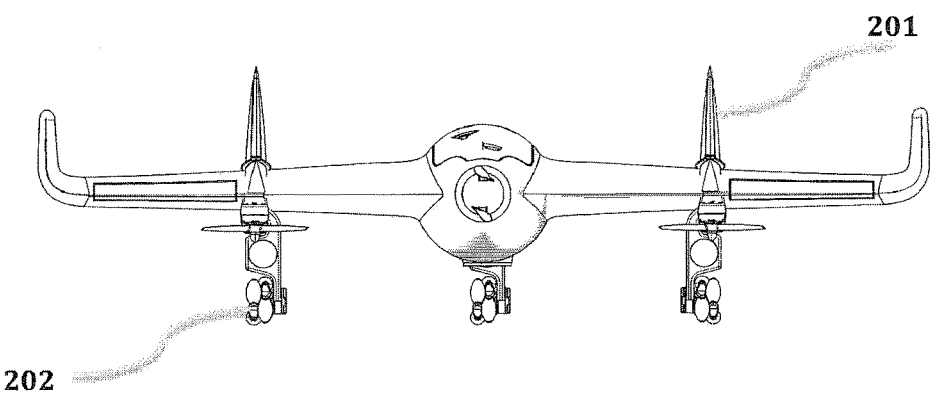
Figure 5:
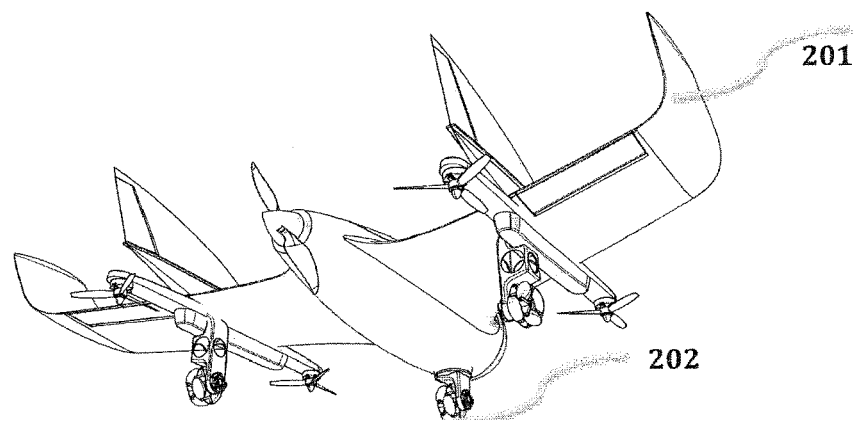
Figure 6:
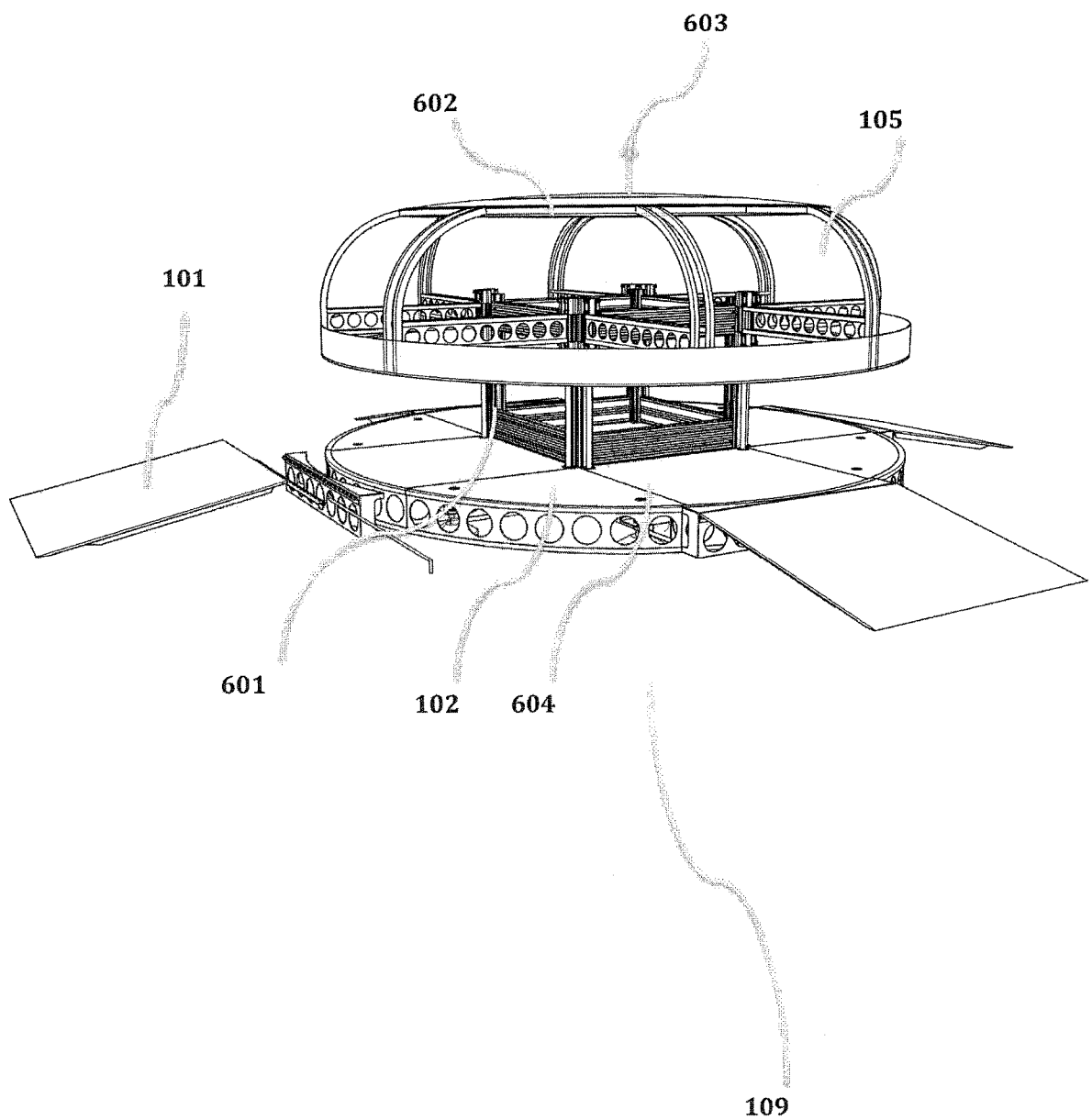
FIG. 6, in accordance with an embodiment of the disclosure, shows a docking and recharging station with a mushroom/umbrella shape where a peculiar shape of the upper shield is highlighted.
Figure 7:
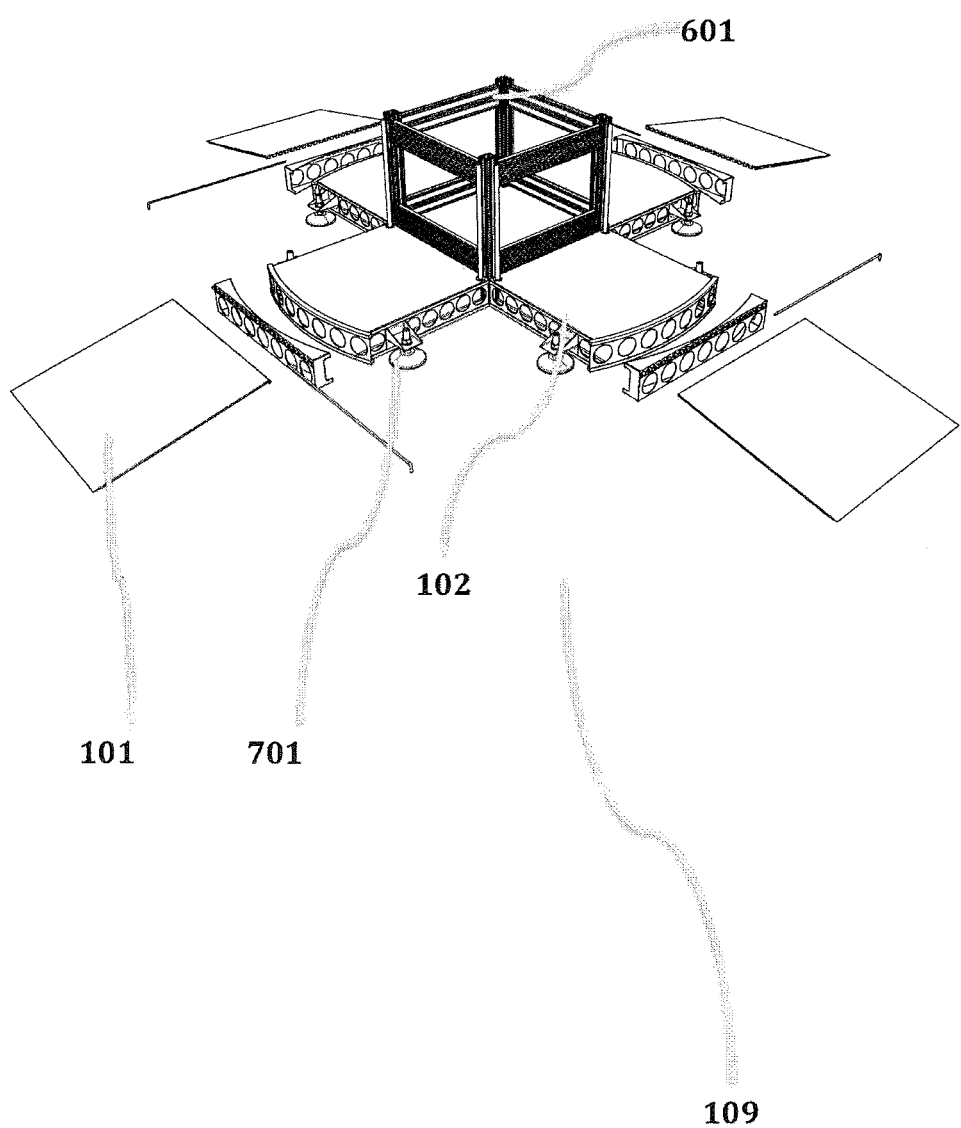
FIG. 7 illustrates some parts of the station shown in FIG. No. 6, according to an embodiment of the invention.
Figure 8:
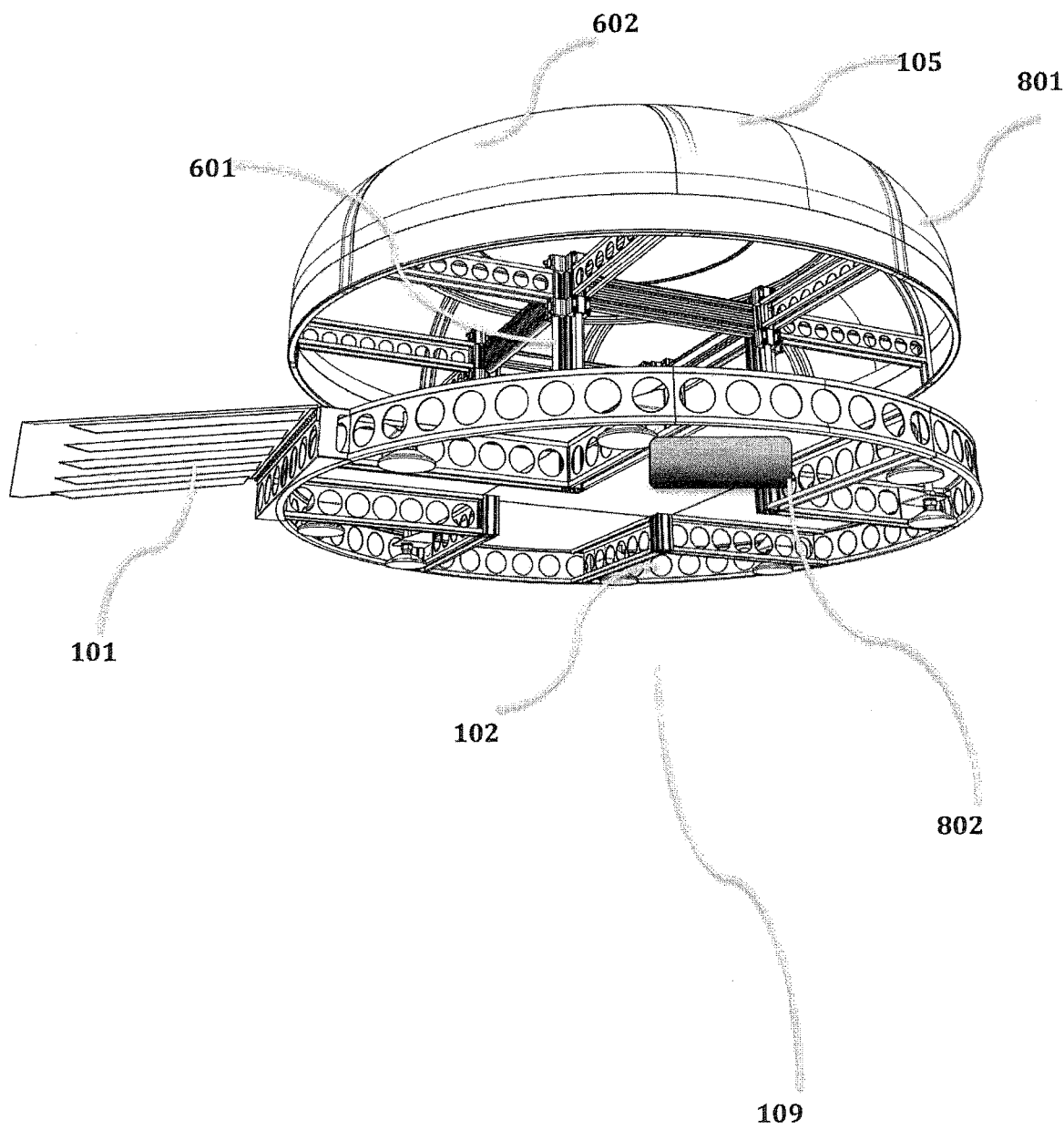
FIG. 8 shows once again from another perspective the same embodiment of the invention that is contained in FIG. No. 6.
Figure 9:
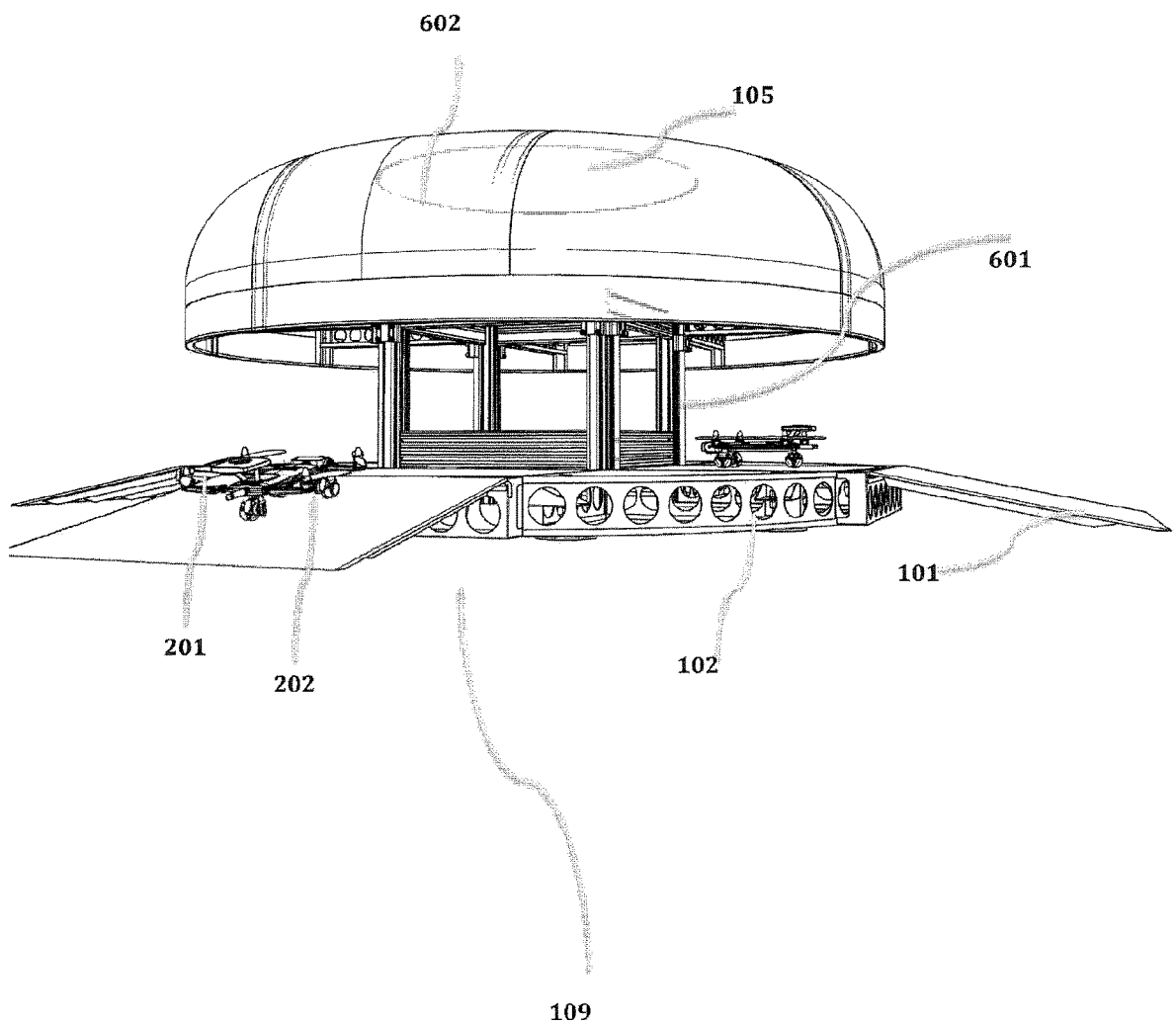
FIG. 9 shows again the same embodiment of the invention illustrated in FIG. No. 6, where multiple UAVs can be spotted approaching the station.
Figure 10:
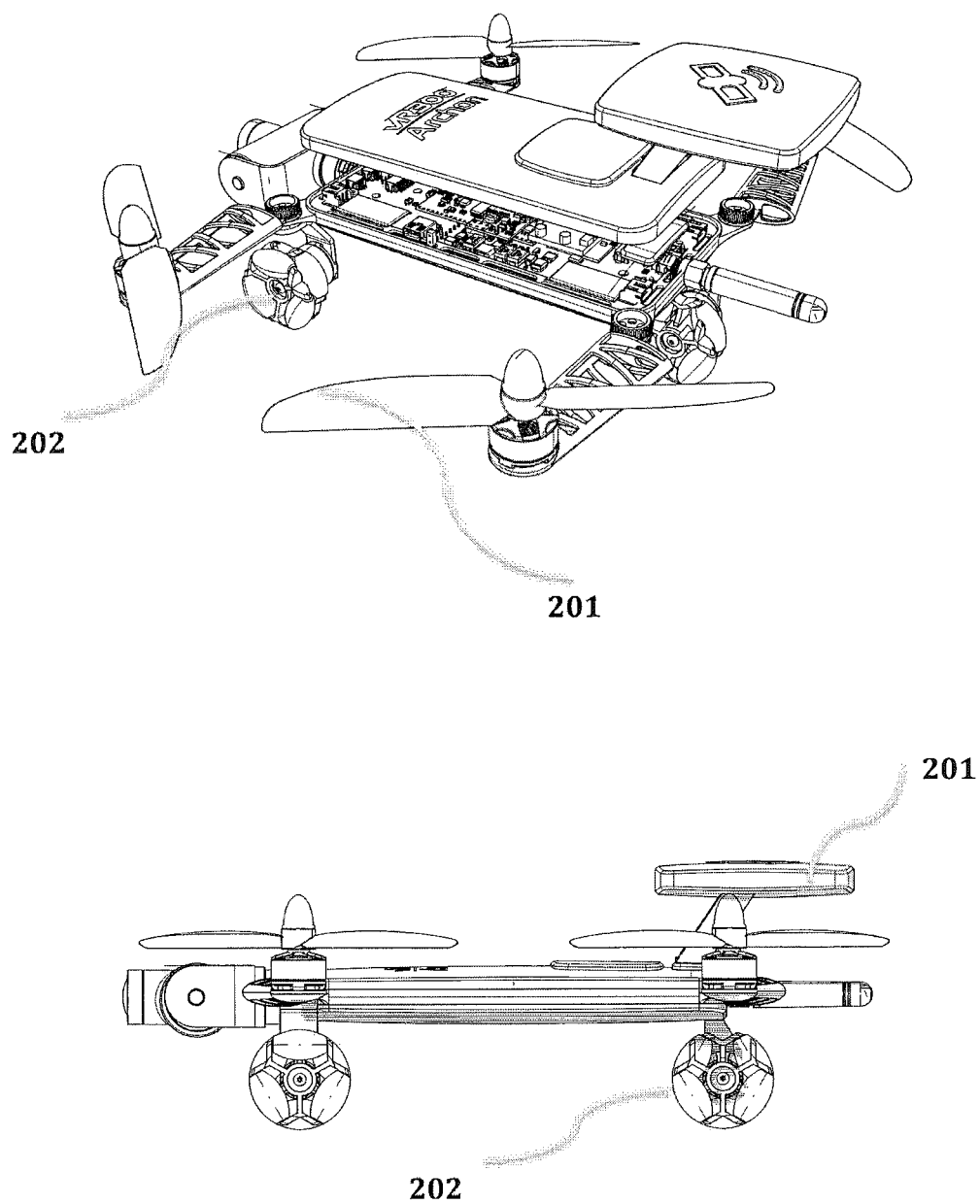
FIG. 10 illustrates another kind of UAV, also equipped with a ground propulsion system.

It must be noted that, for simplicity and clarity of illustration, the elements that are shown in the drawings (or figures) have not necessarily been drawn to scale, so that the dimension of some elements or part of those elements might be exaggerated if compared to other elements present in the same figure.

DETAILED DESCRIPTION

The present disclosure aims at solving the multiple inefficiencies that are related to the Unmanned Aerial Vehicles (UAVs) when they are employed in spaces of considerable dimensions, and especially in outside areas where adverse weather conditions might become a serious issue. UAVs' potential, until now, was also constrained by their limited energy storage and by the fact that recharging them, especially outside, can become a difficult task, and quite a lengthy one, while the present disclosure manages to solve all these problems, and all the ancillary ones connected to the above-referenced issues, with one multi-faceted solution.

Embodiments of the present disclosure include a system (or station) 109 for docking and recharging one or multiple UAVs 201 equipped with a ground-propulsion system 202, and therefore equipped with wheels 202 or other propulsion means (e.g. a continuous track), which comprises a ramp 101 and a platform 102 to which a complex system of circuitry and an interface integrated in the platform 102 that are capable of recharging the UAVs 201, thanks to the connection to an electrical storage unit such as a chemical battery or the grid (electric network) 108, are present.

In some embodiments of the present disclosure, the UAVs 201, thanks to their ground propulsion system 202, can land even far away 301 from the docking and recharging station 109 and only subsequently approach the ramp 101 and, thanks to their propulsion system 202, approach and reach the platform 102, where they can be recharged. Therefore, there is no need for the UAVs 201 to land exactly in one precise spot to be recharged.

In some embodiments of the present disclosure, the docking and recharging station 109 is also equipped with a shield 105 that covers the platform 102, so that the UAVs 201 are protected from adverse weather 112 conditions or other problems. Such shield 105 can also be accompanied by a mechanism 104 that allows the station 109 to be opened or closed so that the UAVs 201, once entered in the docking and recharging station 109 and have reached the platform 102 can stay safely inside the station itself 109, without being exposed to adverse or unwanted weather 112 conditions and while they are being recharged.

Embodiments of the present invention comprise a docking and recharging station 109 which can host, and recharge, more than one UAV 201, as shown for example in FIG. No. 4. Therefore, differently from the previous solutions, multiple UAVs 201 can be shielded and charged simultaneously, without waiting in the air or in the ground before being recharged, wasting time and precious energy.

In one of the embodiments of the invention, the shield 105 of the docking and recharging station 109 has the shape of a fungus cap or an umbrella 602 and is aimed at protecting the UAVs 201 when they either land directly on the platform 102 or they land on the ground 301 and they use the ramp 101 and then, thanks to their ground propulsion system 202, they reach the platform 102, where they can be shielded and/or recharged. In one embodiment of the invention, the described fungus shape of the docking and recharging station allows the UAVs 201 to approach it from any direction, with 360° reachability, with ramps 101 situated in every possible landing direction.

In one embodiment of the invention, the docking and recharging station 109 which has a fungus shape 602 is supported by one or multiple vertical poles 601 but it is also possible for the station 109 to close its cap/umbrella 602 so that the UAVs 201 are protected. In one embodiment of the invention, such protective function is automatically activated thanks to the sensors 203 that are present on the UAVs 201, or in external devices, which detect weather 112 and other flying conditions and transmit, through a communication device 204, to the docking and recharging station itself, which closes its cap 602 or anyway its shield 105 thanks to its closing part 104.

Embodiments of the present invention comprise a recharging platform 102 and/or ramps 101 which make use of inductive wireless technology or capacitive wireless technology or conductive direct contacts 111 installed on the platform 104, so that the UAVs 201 can be recharged in the manner which is most convenient for the different settings. Embodiments of the present invention also include a tether 110 to be connected to the UAVs 201 to exchange data or other information.

In one embodiment of the present invention, multiple localization and guidance sensors 106 are installed either in the platform 102, or the ramps 101, or the shield 105 of the docking and recharging station 109 and they can detect changing weather 112 conditions or other adverse conditions and communicate with the sensors 203 installed on the UAVs 201 through a communication device 107. In one embodiment of the invention, the opening and the closing of the shield 105 602 104 can be done automatically thanks to an exchange of information between the UAVs 201 and the docking and recharging station 109 made possible by the communication devices 204 placed on both the UAVs 201 and the docking and recharging station 109, and thanks to the sensors 106 installed both in the station 109 and on the UAVs 201 203, or externally. In one embodiment of the invention, the sensors 203 installed in the UAV 201 and those 106 installed in the station 109 can help the UAV itself 201 in deciding where it is the best landing spot 301 from which then approach the station 109. Such operation is made easier also by the versatility of the UAVs 201 and their ground propulsion system 202. In one embodiment of the invention, said sensors 203 106 can consist in proximity sensors such as small cameras (including thermal cameras), bulbs or optical LEDs, magnetic, radio signals, focused microwaves, lasers, ultrasound or radar, and also comprise meteorological weather 112 sensor for measuring external environmental conditions. In one embodiment of the invention, the communication device 107 of the station can comprise a wi-fi access point or a W-LAN router or 3G, 4G, 5G, LTE, OFDM, ultra-wide band relay to allow the station 109 to be connected and to provide connectivity to the surrounding area.

In one embodiment of the invention the platform 102 is equipped with static, mechanical or electromechanical guiding barriers or gears 604 to facilitate the proper docking and coupling with the circuits of the UAVs 201 202 when positioning on the platform 102 through the ramps 101.

In one embodiment of the disclosure, the shield 105 602 is equipped with solar panels 801 and with an energy storage unit 802 that can help the station 109 and/or its battery 113 to work without the need to be necessarily connected to the grid 108 or to change a battery 113.

In one embodiment of the present disclosure, the docking and recharging station 109 is movable thanks to a ground propulsion systems (such as wheels or continuous tracks) instead of fixed supports 701 and it can be moved on the ground, also remotely thanks to the communication device 603 107 installed in the station preferably in the shield 105 602.

In one embodiment of the disclosure, the station 109 is equipped with a companion computer 114 capable of autonomously activating the recharging circuits 103, the sensors 106 and any other electronics which may be present on the platform 102 and on the shield 105 602 or in the station 109 generally.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A system to efficiently host and recharge unmanned aerial vehicles comprising:
    a platform;
    a ramp which is connected to the platform, the ramp being configured for ground access by an unmanned aerial vehicle equipped with a ground-propulsion system;
    a circuitry and an interface integrated in the platform that are capable of recharging the unmanned aerial vehicle equipped with a ground-propulsion system;
    a moveable shield disposed over the platform; and
    one or more vertical poles moveably coupling the platform to the moveable shield, the one or more vertical poles being disposed substantially central to the platform and the moveable shield;
    wherein the vertical poles are configured to substantially vertically close the moveable shield so as to protect the unmanned aerial vehicle equipped with a ground-propulsion system during recharging.

2. A system as in claim 1 wherein the platform is equipped with multiple recharging electronics of equal or different nature and with multiple compatible unmanned aerial vehicles equipped with a ground-propulsion system and wherein there are multiple access ramps that allow the unmanned aerial vehicles equipped with a ground-propulsion system to be positioned on the recharging electronics.

3. A system as in claim 1 wherein the circuit electronics capable of recharging is based on inductive wireless technology or capacitive wireless technology or conductive direct contacts installed on the base.

4. A system as in claim 3 wherein the ramp is 360 degrees accessible through a symmetric slope that converges to the region where the recharge circuits are located.

5. A system as in claim 1 wherein a solar panel is installed on top of the shield and connected to a storage battery system to be located under the shield, within the one or more vertical poles, or under the platform.

6. A system as in claim 1 wherein one or multiple localization and guidance sensors are installed across the platform, or the ramps, or the shield.

7. A system as in claim 1 wherein the platform is remotely movable thanks to a ground propulsion mechanism and a data transmission system.

8. A system as in claim 6 wherein the system is equipped with a companion computer capable of autonomously activate the circuit electronics and the sensors present on the platform.

9. A system as in claim 1 wherein a tether is connected to the platform or the ramp and can be connected to the unmanned aerial vehicle equipped with a ground-propulsion system which is equipped to use the tether to exchange energy or data with the system.

10. A system as in claim 1 wherein a tether is connected to the shield and can be connected to the unmanned aerial vehicle equipped with a ground-propulsion system and which is equipped to use the tether to exchange energy or data with the station.

* * * * *